(No Model.)
J. D. HAWES & H. D. McNAIR.
TRACTION WHEEL.
No. 509,221. Patented Nov. 21, 1893.
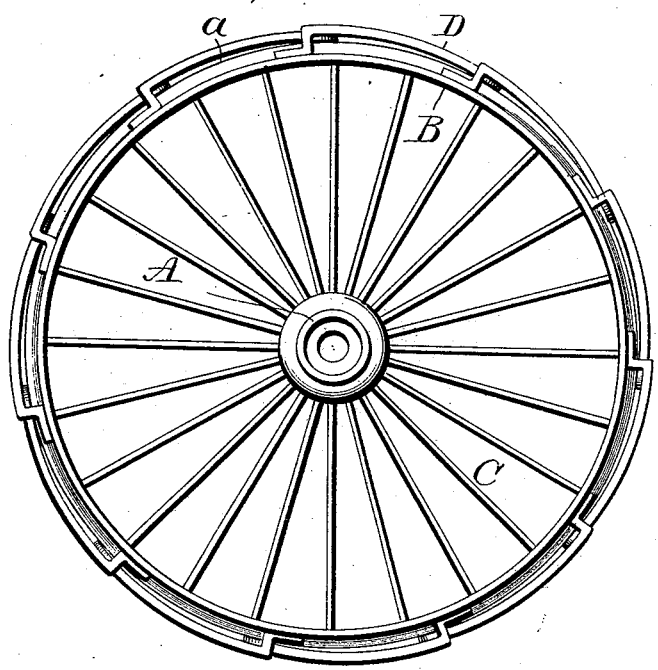
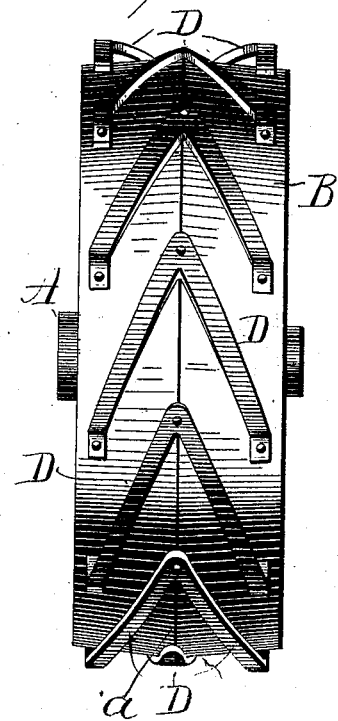
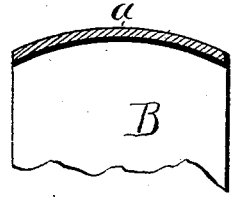
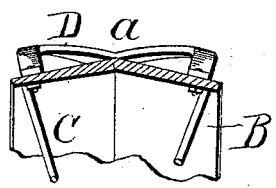
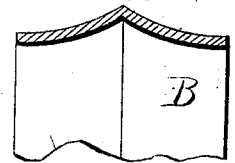
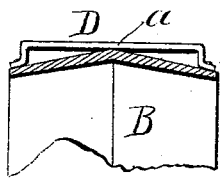
Witnesses
R. Nottingham
G. F. Downing
Inventors
J. D. Hawes and
H. D. McNair
By H. A. Seymour
Attorney.
THE NATIONAL LITHOGRAPHING COMPANY,
WASHINGTON, D. C.

UNITED STATES PATENT OFFICE.

JOEL D. HAWES AND HERBERT D. McNAIR, OF DECORAH, IOWA.

TRACTION-WHEEL.

SPECIFICATION forming part of Letters Patent No. 509,221, dated November 21, 1893.

Application filed March 21, 1893. Serial No. 467,089. (No model.)

*To all whom it may concern:*

Be it known that we, JOEL D. HAWES and HERBERT D. McNAIR, of Decorah, in the county of Winneshiek and State of Iowa, have invented certain new and useful Improvements in Traction-Wheels; and we do hereby declare the following to be a full, clear, and exact description of the invention, such as will enable others skilled in the art to which it appertains to make and use the same.

Our invention relates to an improvement in traction wheels,—the object of the invention being to construct a traction wheel in such manner that it will be self-cleaning when in use.

A further object is to so construct a traction wheel that lateral movement thereof will be effectually prevented.

A further object is to produce a traction wheel which shall be simple in construction, and effectual, in every respect, in the performance of its functions.

With these objects in view the invention consists in certain novel features of construction and combinations and arrangements of parts as hereinafter set forth and pointed out in the claims.

In the accompanying drawings: Figure 1 is a side view of a wheel embodying our improvements. Fig. 2 is a peripheral view. Fig. 3 is a cross section. Figs. 4, 5, and 6 are views of modifications.

A represents the hub of the wheel, B the rim and C the spokes connecting the rim and hub. The rim B of the wheel is made higher or larger at its center, as at $a$, than at its edges, and the rim therefore slopes from the center to the edges, as shown in Fig. 3. If desired the rim may be made in the form shown in Fig. 4 or Fig. 5, but in any event it is higher at the center than at the edges.

Ribs or barbs D are located on the rim B and secured thereto in any suitable manner, said ribs or barbs being secured to the rim in proximity to the edges thereof and to the raised portion $a$ and are so formed as to leave a space between them and the rim between the points of attachment of said ribs or barbs to the rim.

In Fig. 2 the ribs or barbs are shown as V-shaped having their ends bent downwardly and secured to the rim near its edges and having their apexes resting on the portion $a$ of the rim. The ribs or barbs D may be of any other desired shape,—for instance, they may be straight as shown in Fig. 6 arranged either parallel with the axis of the wheel or diagonally,—but in all cases they are so formed and attached to the wheel as to leave a space between them and the rim.

By constructing the rim of the wheel with a raised center and sloping faces, it will be seen that the mud adhering to it will be forced off as the wheel moves, and that the removal of the mud from the rim of the wheel will not be prevented by the ribs or barbs D, as said ribs or barbs are arranged so as to leave a space between them and the rim of the wheel. It will also be seen that as the central or raised portion $a$ of the rim of the wheel will enter the ground farther than the edges of the rim, the lateral movement of the wheel will be effectually prevented.

The wheel is very simple in construction, cheap to manufacture, is strong, and is effectual in the performance of its functions.

Having fully described our invention, what we claim as new, and desire to secure by Letters Patent, is—

1. A traction wheel having an enlarged or raised central portion on its rim and ribs or barbs secured to the raised central portion of the wheel rim and also at each side thereof near the edges of the wheel, substantially as set forth.

2. In a traction wheel, the combination with a rim, of ribs or barbs secured thereto so as to leave a space between them and the rim, substantially as set forth.

3. In a traction wheel, the combination with a rim larger at its center than at its edges, of ribs or barbs secured thereto so as to leave a space between them and the rim, substantially as set forth.

4. In a traction wheel, the combination with a rim larger at its center than at its edges, of V-shaped ribs or barbs secured at their ends to the rim near its edges, said ribs or barbs being so bent as to leave a space between them and the rim, substantially as set forth.

In testimony whereof we have signed this specification in the presence of two subscribing witnesses.

JOEL D. HAWES.
HERBERT D. McNAIR.

Witnesses:
R. F. GIBSON,
A. K. BAILEY.